Nov. 29, 1960

W. F. ALLER ET AL 2,962,165

GAGING APPARATUS

Filed April 30, 1956

4 Sheets-Sheet 1

INVENTORS
Willis Fay Aller
Norman L. Geglum
BY Edward J. Noe
Atty.

Nov. 29, 1960      W. F. ALLER ET AL      2,962,165
                      GAGING APPARATUS
Filed April 30, 1956                    4 Sheets-Sheet 2
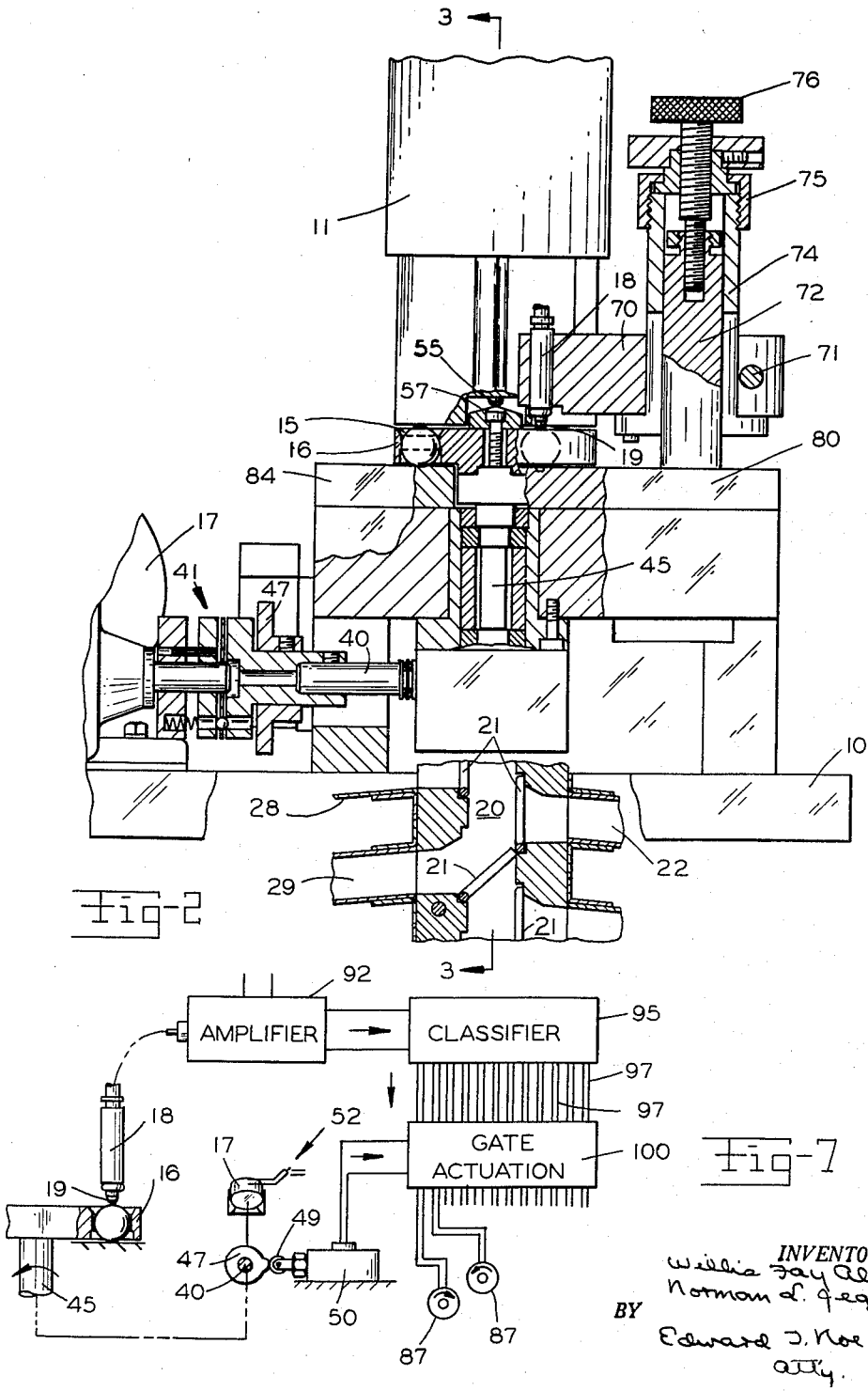
INVENTORS
Willis Jay Aller
Norman L. Geglum
BY
Edward J. Noe Jr.
atty.

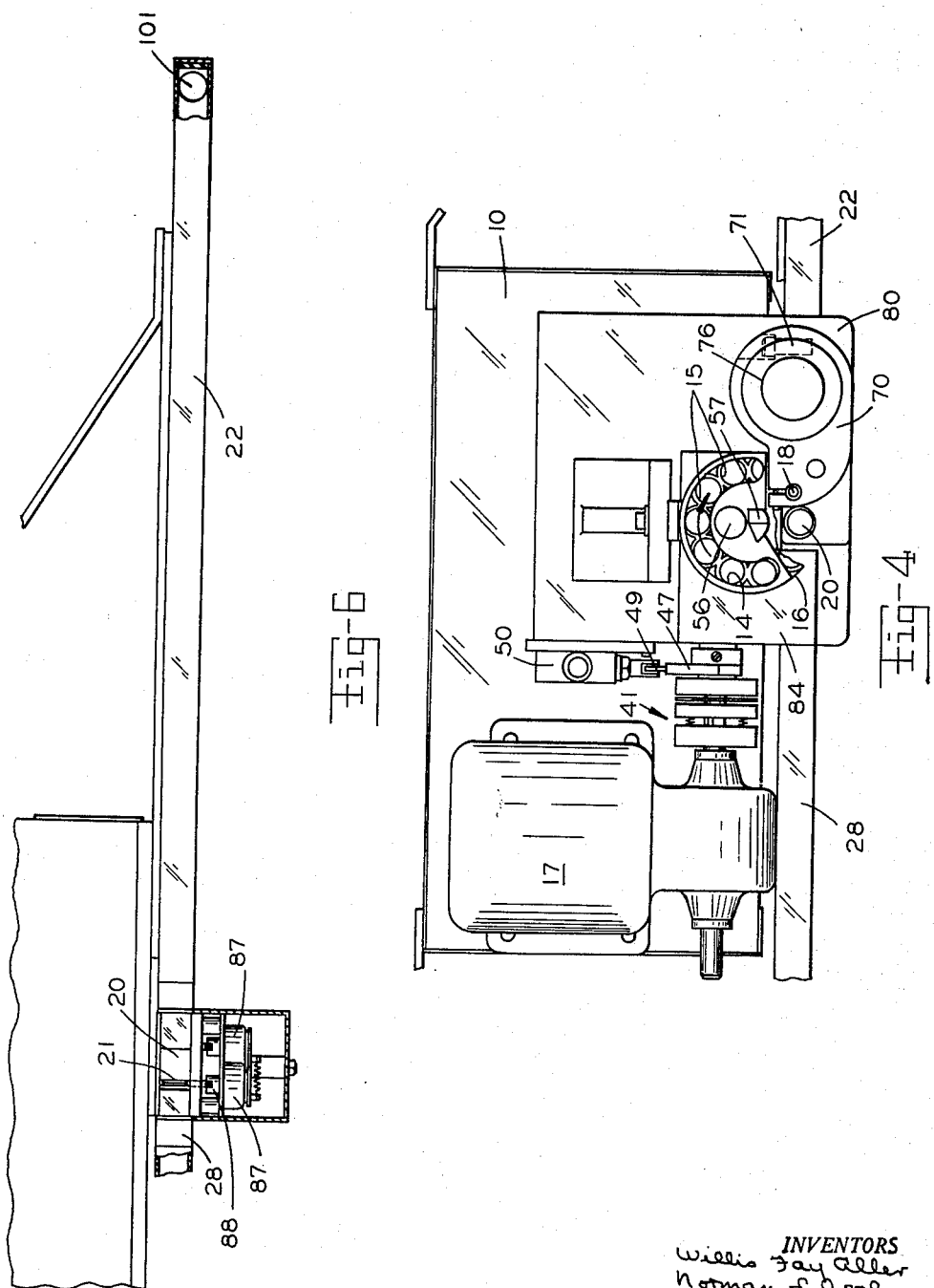

Nov. 29, 1960
W. F. ALLER ET AL
2,962,165
GAGING APPARATUS
Filed April 30, 1956
4 Sheets-Sheet 4
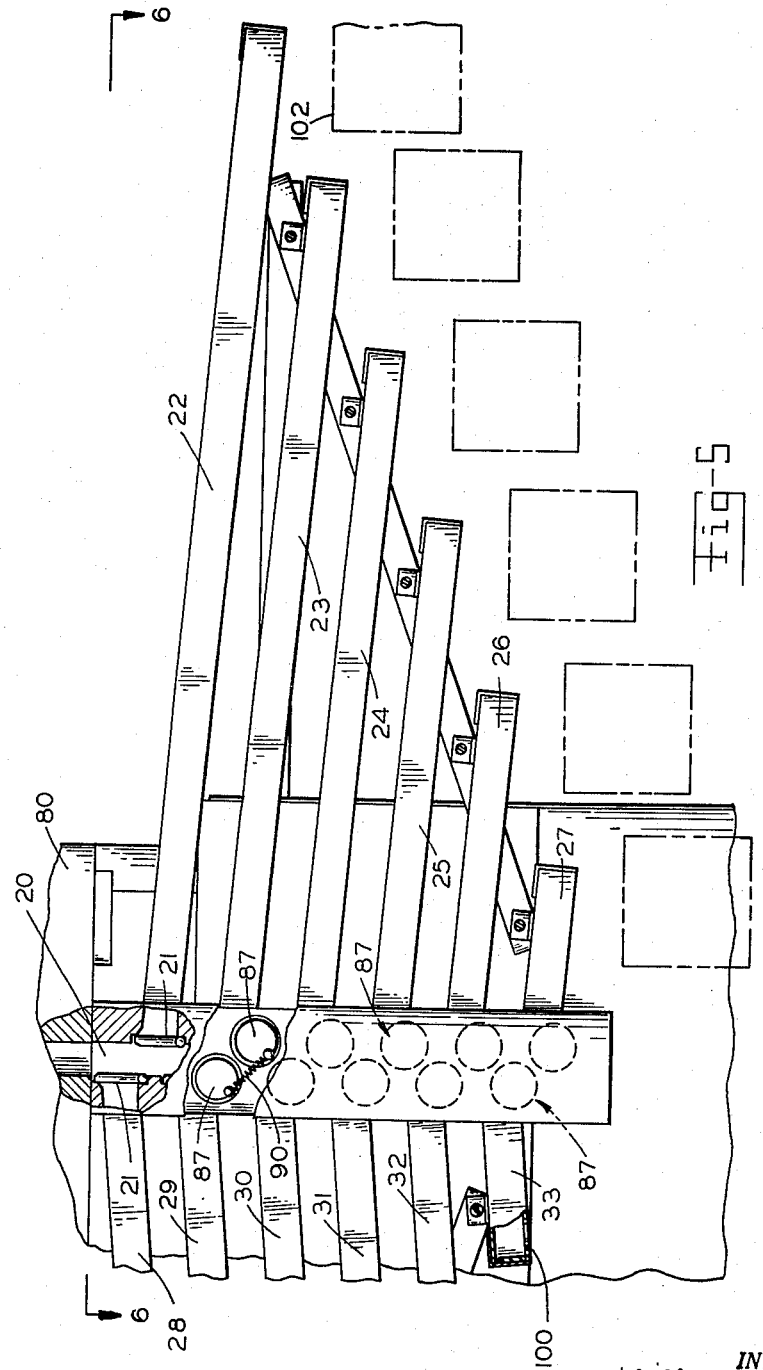
INVENTORS
Willis Jay Aller
Norman J. Jeglum
BY
Edward J. Noe Jr.
Atty.

United States Patent Office 2,962,165
Patented Nov. 29, 1960

2,962,165
GAGING APPARATUS

Willis Fay Aller and Norman L. Jeglum, Dayton, Ohio, assignors, by mesne assignments, to The Sheffield Corporation, a corporation of Delaware Filed Apr. 30, 1956, Ser. No. 581,722

5 Claims. (Cl. 209—82)

This invention relates to an apparatus for automatically gaging and selecting parts.

It is an object of this invention to provide an apparatus for automatically gaging parts such as balls in a sequential manner wherein part movements are continuous and uniform for precision gaging at an extremely high rate and apparatus movements are free from shocks, reversals or discontinuities.

It is a further object to provide such an apparatus which is simple in construction and operation for economical manufacture and reliable operation through a long service life.

It is a further object to provide such an apparatus wherein balls or the like are automatically loaded by gravity into receiving pockets of a turntable or the like continuously driven in a uniform manner to carry each part past a gage head and over a receiving means for further movement by gravity to a selection means or the like.

It is a further object to provide a selection or segregating assembly for use in such apparatuses wherein parts moving by gravity are selectively diverted by gates or the like into one of a plurality of distributing chutes extending from each side of a receiving chute and of progressively decreasing lengths downward.

It is a further object to provide such an apparatus for high speed gaging wherein an electrical signal pulse is obtained simultaneous with the momentary gaging of a part to time the gaging of the particular part and selection of a part previously gaged.

Figure 1:
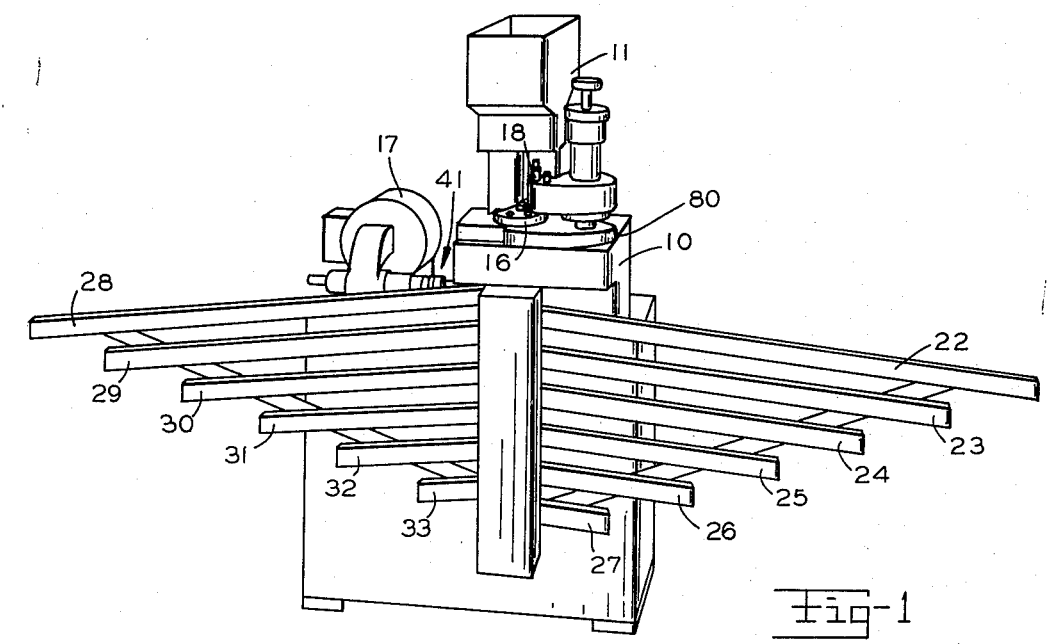
Figure 3:
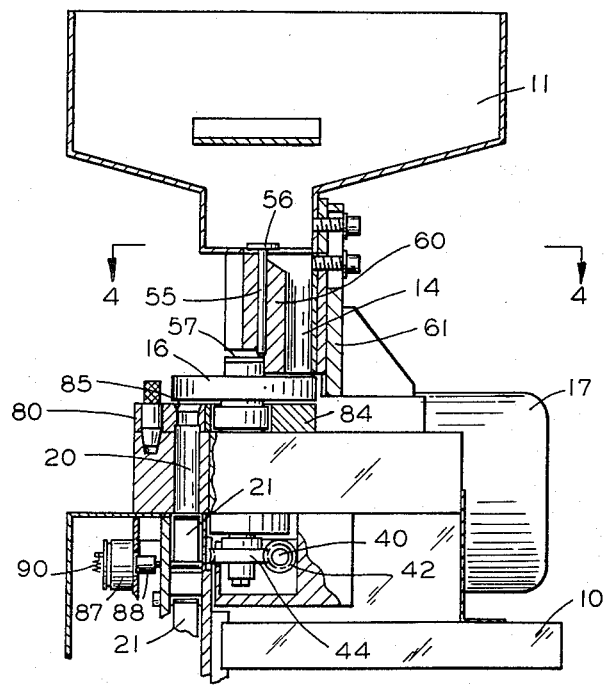

Other objects and advantages of the present invention will be apparent from the following description, the appended claims, and the accompanying drawings, in which, Figure 1 is a perspective view of an apparatus for gaging and segregating balls and embodying the features of this invention, Figure 2 is a front view of the upper portion of the apparatus of Figure 1, partially broken away to central vertical section, Figure 3 is a sectional view on line 3—3 of Figure 2, Figure 4 is a view on line 4—4 of Figure 3 with the ball-receiving hopper removed, Figure 5 is a fragmentary illustration of the lower front portion of the apparatus, illustrating primarily the distributing chutes for ball segregation, Figure 6 is a view of the distributing chutes taken on line 6—6 of Figure 5, and Figure 7 is a diagram illustrating an exemplary gaging and selecting circuit.

The apparatus of the present invention is provided for high speed gaging of parts wherein the parts are sequentially moved in a continuous and uniform manner from a loading position, through a gaging station, and to selection or segregating means. In the illustrated application parts such as balls or the like are loaded by gravity from a hopper into pockets provided in a turntable rotating at a uniform velocity. Each ball is carried past a gage head where its diameter is momentarily measured as it moves past a gaging work contactor and to a position over a receiving chute into which it falls. Distributing chutes extending to each side of the receiving chute have gates at their upper ends which are selectively actuated in response to the gaging and in timed relation to part movement to divert the balls into the distributing chutes in accordance with their gaged dimension.

While a particular structural embodiment of the present invention is illustrated as applied to the gaging of balls for bearing assemblies it will be understood that the present invention is not restricted to the specific apparatus disclosed and that it would have application to gaging other parts.

Referring more particularly to the drawing, the apparatus comprises a base 10 supporting a ball hopper 11. Balls from hopper 11 are fed by gravity down a loading chute 14 into receiving pockets 15 provided in a turntable 16 which is continuously and uniformly driven by an electric motor 17. During operation each ball is sequentially moved into association with the work contactor 19 of an electric gage head 18 to obtain a signal determined by the ball dimension. Upon further rotation of turntable 16 the gaged ball drops into receiving chute 20 for movement by gravity through the segregating or selecting mechanism. Selection gates 21 which normally lie vertically along the walls of chute 20 can be selectively swung into the chute to divert a ball into the respective one of distributing chutes 22 to 33 extending to each side of receiving chute 20.

Motor 17 is connected to a drive shaft 40 through slip clutch 41. Drive shaft 40 has a worm 42 at its outer end in mesh with a worm gear 44 at the lower end of a turntable supporting shaft 45. Cam 47 driven by drive shaft 40 is in actuating engagement with roller 49 of switch unit 50 to provide a signal pulse simultaneous with the momentary gaging. In this particular example there are 10 ball receiving pockets in turntable 16 and worm 42, worm gear 44 drive in a 10 to 1 ratio in order that switch 50 be actuated in timed relation to the ball gaging. Motor 17 is energized to drive turntable 16 when switch 52 (Figure 7) is closed to the power source. In this application switch unit 50 is provided to "read out" the gaged dimension and simultaneously time the actuation of selection gates to select the next preceding ball.

The upper end 56 of agitator 55 extends into hopper 11 to agitate the balls upon vertical reciprocation of the agitator. A surface cam 57 fixed to the upper surface of turntable 16 engages and reciprocates agitator 55 to agitate the balls for free flow.

A loading block 60 adjustably mounted on standard 61 extends from the lower end of hopper 11 to a point just above turntable 16. Loading chute 14 formed therein has an enlarged upper portion as seen in Figure 3 and its lower end is substantially arcuate in configuration, being of a width to extend to each side of a series of pockets 15 and of an arcuate length sufficient to span a plurality of the pockets. This relationship is seen particularly in Figure 4. As the ball receiving pockets are moved along the lower end of loading chute 14 balls will fall thereinto by gravity. Pockets 15 are of a depth allowing the balls to project slightly above turntable 16.

Work contactor 19 of gage head 18, having a small flat at its lower end for momentary gaging positioning of the contactor, is situated in the path of pockets 15 and after each pocket has traversed the extent of loading chute 14 it carries a ball into association with the gage head. It is important that gage head 18 be properly positioned. For this purpose it is carried on an arm 70 adjustably clamped by means of a screw 71 to vertical post 72. For adjustment, screw 71 is loosened and sleeve 74 supporting arm 70 is vertically adjusted. Upon rotation of nut 75 the gage head is raised or lowered rapidly and rotation of knob 76 turns a differential screw for fine adjustments. Following this, screw 71 is again tightened and the gage head is firmly fixed in its adjusted position. A plate 80 extends closely beneath turntable 16 and cooperates with each pocket 15 to maintain the ball in position during gaging. Arm 70, post 72, and plate 80 effectively provide a firm and rigid calipering device for precision measurement of the balls as they pass under work contactor 19.

Plate 80 which serves to support the ball during gaging also provides the downwardly tapered upper end 85 of receiving chute 20. A second plate 84 supported on base 10 is imperforate and extends beneath turntable 16 to maintain the balls in the pockets 15 until they are above the receiving chute. Tapered portion 85 of chute 20 insures easy entry of each of the balls from the receiving pockets into the receiving chute and allows them to clear the respective pocket during a portion of turntable rotation. Similarly the upper end of each pocket is downwardly tapered as seen in Figure 2, cooperating with the lower end of loading chute 14 for loading by gravity.

Receiving chute 20 extends vertically downward below the gaging station and at the forward face of the apparatus. Distributing chutes 22 to 33 extend to opposite sides thereof and are of progressively decreasing lengths toward the lower end of the apparatus. Each of the distributing chutes is normally closed by a gate 21 vertically positioned at its upper end. Each of gates 21 is rotated to a ball diverting position within chute 20 by means of a rotary solenoid 87 energized by an electric circuit later described. In Figure 6 the coupling between gate 21 and rotary solenoid 87 is indicated at 88.

The rotors of each adjacent pair of solenoids 87 are biased to gate closing positions by means of a spring interconnected between the rotors as indicated at 90 in Figure 5. It will be seen that as the rotors of either of the solenoids 87 associated with spring 90 are rotated to gate opening position they will serve to more firmly urge the gate of the cooperating solenoid to gate closing position. In Figure 2 the gate 21 for distributing chute 29 is shown swung across receiving chute 20 to divert a ball falling by gravity into chute 29.

Openings 101 at the outer ends of each of distributing chutes 22 to 33 allow the selected balls to drop into suitable containers such as indicated at 102 in Figure 5.

In the operation of the present apparatus the only time restriction is that necessary for a ball to fall from its receiving pocket and past the selection gates. As previously mentioned switch 50 provides a signal pulse simultaneously with the momentary passage of a ball beneath work contactor 19. In one example of actual operation the timing is as follows. Switch 50 is actuated to "read out" the gaged dimension of a first ball during the momentary gaging displacement of contactor 19. When the switch is actuated a second time the gaging of ball two is completed and the proper selection gate is actuated for selection of ball one. Because the upper end of chute 20 is enlarged (see Figure 3) the ball drops prior to precise arrival of the pocket in alignment with the receiving chute and has substantially traversed the upper cylindrical portion of the chute to the upper gate 21 before the proper gate is actuated. The ball one selection is held until just prior to gaging of ball three and selection of ball two. High rates of gaging and selection are therefore possible.

The gage head 18 used in this exemplary application can be of a type wherein an armature or core is positioned within a differential transformer by work contractor 19. Voltages determined by the diameter of each gaged ball are amplified in a unit 92. A suitable circuit which can be employed is described in detail in application No. 501,602, filed April 15, 1955, now Patent No. 2,885,660. The electrical signals from amplifier 92 are then fed to a classifying unit 95 which can, for example, close a switch in one of twelve circuits 97 leading to a gate actuating circuit 100 of a conventional character. A suitable classifying system which can be employed is disclosed in application No. 539,484, filed October 10, 1955.

In this example twelve classifier signals are provided, one for each of the distributing chutes. These can provide ten size classifications and over and under size classifications.

With switch 50 operated in timed relation to the gaging of the balls and the classification signals provided by classifier 95 a gate actuation circuit 100 can be used to energize rotary solenoids 87 in accordance with the gaged dimension and in timed relation with the gaging operation.

Thus it is seen that an apparatus has been provided for rapidly and precisely gaging parts. The apparatus is extremely simple in construction and because of its continuous and uniform movements is reliable for a long service life.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gaging parts such as balls or the like comprising a base, a hopper on said base, a turntable rotatably supported on said base beneath said hopper having a series of part receiving pockets about its axis of rotation and extending vertically therethrough, chute means cooperating between said hopper and the upper surface of said turntable for loading a part into each of said pockets by gravity during turntable rotation, a gage head mounted on said base in the path of movement of the part receiving pockets for gaging association with parts carried thereby, means on said base closely adjacent the lower surface of said turntable cooperating therewith to maintain the parts in the receiving pockets and including an opening below the turntable between the hopper loading position and the gage head for receiving parts dropping from the pockets following gaging, continuously operable drive means connected to said turntable for uniform rotation thereof to carry each pocket in sequence beneath the loading chute, past the gage head over the receiving opening, and selection means associated with said receiving means operated in response to said gage head and in timed relation with said drive means and timing means connected to said selection means including switch means operated simultaneously with arrival of a part in gaging association with said gage head for operating said selection means for selecting a first part upon arrival of a second following part in gaging position.

2. Ball gaging apparatus comprising a base, a ball hopper on said base, a turntable rotatably supported on said base having a series of ball receiving pockets extending therethrough equally spaced at equal radii about its axis of rotation, cam means carried by said turntable, an agitator extending into said hopper having a follower operated by said cam means for agitation of the hopper contained parts, chute means cooperating between said hopper and said pockets having a lower opening adjacent the upper surface of said turntable encompassing a plurality of ball receiving pockets for automatic ball loading by gravity, a gage head mounted on said base in the path of movement of the ball receiving pockets for gaging association with balls carried thereby, receiving means below said turntable between the hopper loading position and the gage head for receiving balls dropping from the pockets following gaging, continuously operable drive means connected to said turntable for uniform rotation thereof to carry each pocket in sequence beneath the hopper chute means, past the gage head and over the receiving means, and selection means associated with said receiving means operated in response to said gage head and in timed relation with said drive means.

3. An apparatus as set forth in claim 2 wherein the lower end of said hopper chute provides an opening generally arcuate in configuration, having a length to extend over a plurality of pockets and extending to each side of said plurality of pockets.

4. An apparatus as set forth in claim 2 wherein the upper end of each of the ball receiving pockets has a tapered entrance and the upper end of the receiving means is correspondingly tapered.

5. Apparatus for sequentially gaging and segregating similar parts comprising a base, a gaging station on said base for the sequential gaging of parts, supply means for supplying parts to said gaging station, receiving means associated with said gaging station for receiving parts following gaging and including a substantially vertical receiving chute, downwardly inclined distributing chutes extending from each side thereof in a common plane and in relatively staggered relation, the distributing chutes at each side of the receiving chute progressively decreasing in length downward, a distributing outlet adjacent the outer end of each of said distributing chutes, located outward beyond the chutes below, selection gates at the upper ends of each of said distributing chutes movable into the receiving chute to divert a part into the respective distributing chute, means operatively connected between said gaging station and said selection gates for operating the selected gate in accordance with the gaged dimension and in timed relation to said gaging station, resilient means cooperating between each adjacent pair of gates biasing the gates to closed position, and means for selectively rotating one of the gates to open position whereby the other gate of the respective pair is further biased to closing.

References Cited in the file of this patent
UNITED STATES PATENTS

| | | |
|---|---|---|
| 626,539 | Hathorn | June 6, 1899 |
| 1,826,527 | Schlaupitz | Oct. 6, 1931 |
| 2,429,891 | Neff | Oct. 28, 1947 |
| 2,523,555 | Boosey | Sept. 26, 1950 |
| 2,592,157 | Kendall | Apr. 8, 1952 |
| 2,634,859 | Jagen | Apr. 14, 1953 |